No. 793,557.

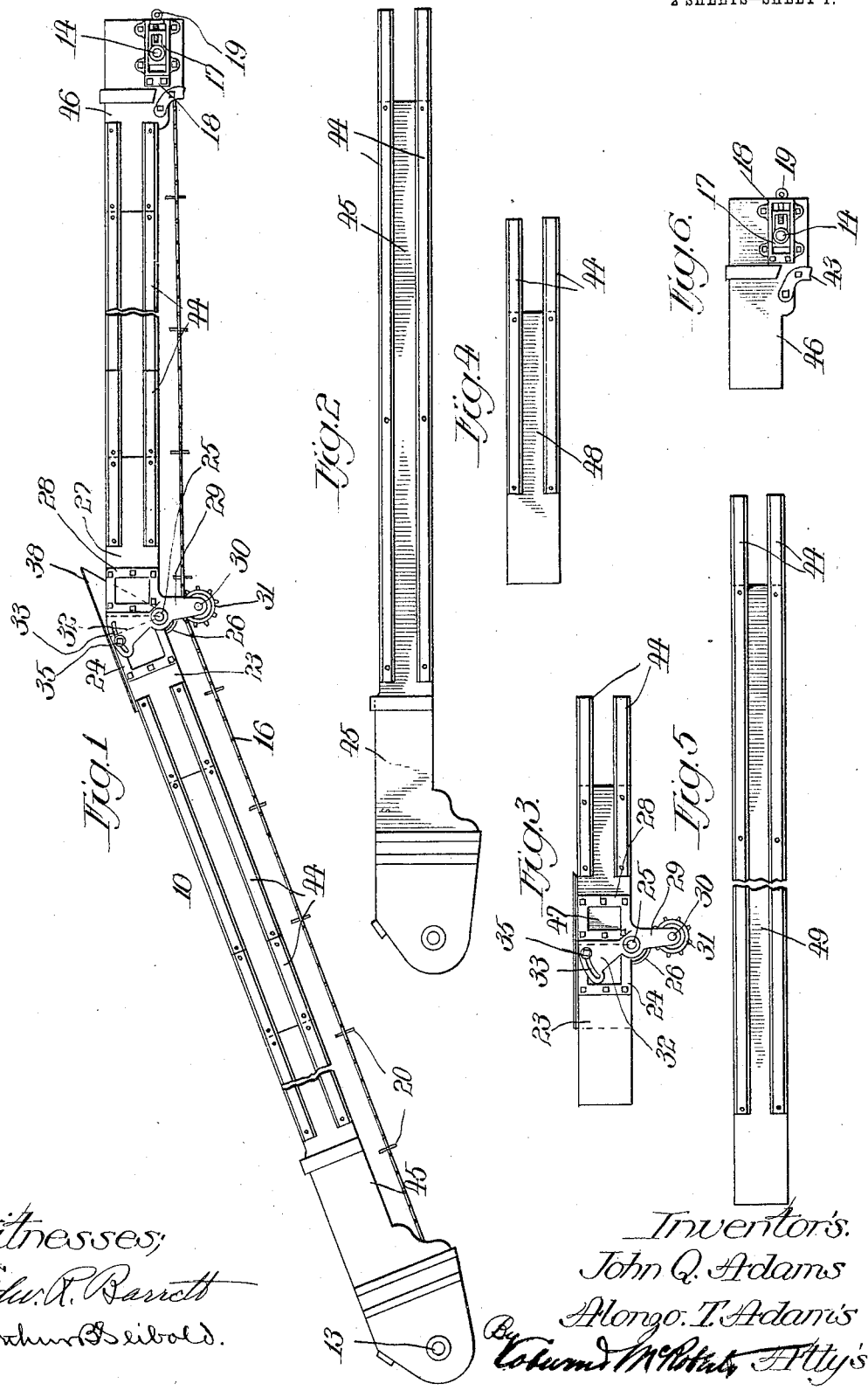

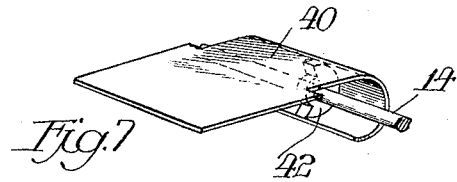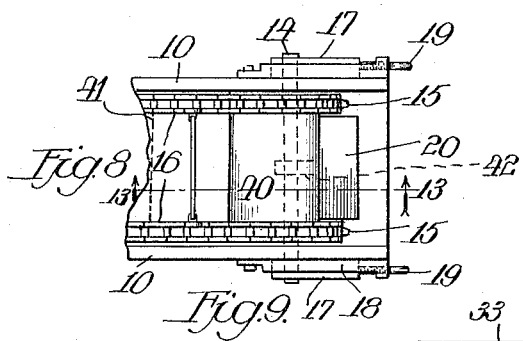

Patented June 27, 1905.

UNITED STATES PATENT OFFICE.

JOHN Q. ADAMS AND ALONZO T. ADAMS, OF MARSEILLES, ILLINOIS.

CONVEYER.

SPECIFICATION forming part of Letters Patent No. 793,557, dated June 27, 1905.

Application filed July 18, 1904. Serial No. 216,961.

*To all whom it may concern:*

Be it known that we, JOHN Q. ADAMS and ALONZO T. ADAMS, citizens of the United States, residing at Marseilles, in the county of Lasalle and State of Illinois, have invented certain new and useful Improvements in Conveyers, of which the following is a specification.

Our invention has reference to certain new and useful improvements in conveyers of that class employed for conveying corn, wheat, or other grains or substances; and it has particular reference to a conveyer comprising a plurality of hinged sections whereby the discharging end of the conveyer may be deflected or adjusted so as to discharge the material conveyed thereby at any desired point.

The invention also relates to a deflector located at the discharging end of the conveyer and designed to insure the material being carried over the end of the conveyer and prevented from being thrown rearwardly by the conveyer-flights.

The invention also has reference to a conveyer made of units of varying lengths adapted to be joined together, whereby a conveyer of any desired length may be built up from the units in stock, thereby obviating the manufacturing or making of conveyers of varying lengths especially to order.

The invention also contemplates the provision of a conveyer-trough provided with guide-strips adapted to form a channel the width of the flights and to support the chains carrying the flights in order to maintain the latter in their upright positions while traveling over the bottom of the conveyer-trough.

Other objects and advantages of the invention will be apparent from the accompanying description, in which the invention is fully set forth.

In the drawings, Figure 1 is a side elevation of a conveyer constructed in accordance with our invention. Figs. 2, 3, 4, 5, and 6 illustrate in side elevation a series of units from which the conveyer may be built up, Fig. 2 showing the receiving or boot end of the conveyer, Fig. 6 the discharging end of the conveyer, Figs. 4 and 5 intermediate units of different lengths, and Fig. 3 the hinged unit. Fig. 7 is a detail perspective view of the deflector. Fig. 8 is a plan view of the upper or discharging end of the conveyer. Fig. 9 is a fragmentary view, in side elevation, showing the hinged connection between the adjustable sections. Fig. 10 is a plan view of the construction shown in Fig. 9. Fig. 11 is a section on the line 11 11 of Fig. 10. Fig. 12 is a section on the line 12 12 of Fig. 10, and Fig. 13 is a section on the line 13 13 of Fig. 8.

In the embodiment of the invention illustrated the conveyer is provided with an elongated trough-shaped body 10, the bottom 11 of which may, as usual, be provided with suitable metal sheathing 12. Journaled on the sides of the conveyer at the opposite ends are transverse shafts 13 14, having fixed thereto carrying-wheels, such as sprockets 15, located adjacent the sides of the conveyer-trough, as shown in Fig. 8. Coöperating with each side pair of sprocket-wheels is a chain 16, the said sprockets being so positioned that the upper stretches of the chains travel along and over the bottom of the conveyer-trough. In order to keep the chains properly stretched and at the desired tension, one of the shafts, as 14, located at the discharging end of the conveyer, may be adjustably mounted in the usual manner, such shaft being journaled in sliding blocks 17, moving in guides 18, secured to the sides of the conveyer-body, as shown in Figs. 1, 6, and 8, and adjusted by screws 19.

The conveyer-flights, which consist of slats 20, are secured at their ends to the sprocket-chains 16 at opposite points and are so disposed that they stand substantially at a right angle to the trough-bottom while moving along and in contact with the latter, each flight being rigidly attached to the chains midway between its longitudinal edges—that is to say, midway between its upper and lower edges as the flights move in a line parallel with the bottom of the trough. As the conveyer-flights are attached to their chains at their ends, it is obvious that they do not fill or extend wholly across the inside area of the trough, and therefore when small grain—such as shelled corn, wheat, &c.—is acted upon some of the material would extend beyond the line of action of the flights. In order to obviate this objection and provide a channel of substantially the width of the flights, the strips 21 are secured in the trough adjacent the sides thereof and between which the flights fit snugly, but move freely. The strips 21 also serve to maintain the flights in their proper positions and prevent their tilting or becoming inclined, as they are located immediately under and in position to support the upper stretches of the chains, so that the latter will not sag or exert a tendency to tilt the flights. By this arrangement the line of pull on the flights is constant. The supports 21 may be made of continuous strips or of short adjacent lengths, as shown in Fig. 10, and secured in position in any suitable manner. When the material being conveyed is in small particles—such as shelled corn, wheat, &c.—it has a tendency to get under the chains and lift them from their supports, resulting in raising the flights out of contact with the conveyer-bottom. To avoid this, the supports 21 are provided on their inner or facing sides at suitable intervals with pockets 22, which are preferably of the V shape shown and open into the trough. With this arrangement as the chains travel over the supports any grain accumulating or lodging under the chains is carried along by the latter until the pockets are reached, when it falls or is crowded by the action of the chains into the pockets and returned into the path of the flights.

As the crib, bin, or other receptacle into which the grain is to be discharged may be so located as to prevent the use of a conveyer consisting of a straight flight or as it is sometimes desired to convey the grain upwardly and then horizontally to a remote part of the bin or crib, the conveyer may be made in sections connected in such manner as to provide the conveyer with an adjustable delivery end capable of being raised or lowered or inclined at an angle to effect the discharge of the grain at the desired point. These sections are hinged together in the manner shown in Figs. 1, 3, and 9 to 12, inclusive, and, as there shown, one section, as 23, is provided on the outer face of each side with a plate 24. Mounted on the plates 24 is a transverse shaft 25, provided at points corresponding with the positions of the chains with idlers 26, the chain-supports 21 in each section terminating adjacent the idlers 26 and the latter extending at their periphery to about the same height as the said supports to carry the chains across the gap between the supports, as shown in Fig. 12. Secured on the sides of the adjacent end of the other section 27 are plates 28, pivoted on the ends of the shaft 25, so that the said section may swing on such shaft. Each of the plates 28 is provided with a depending arm 29, in which is journaled one end of a shaft 30, having secured thereon idler-sprockets 31, with which mesh and over which travel the lower stretches of the chains 16. A wing 32, rigid with each plate 28, overlaps the plate 24 on the adjacent side of the section 23, the wing being offset, as shown in Fig. 10, to accommodate the plate 24, and is provided with a slot 33, concentric with the shaft 25. Bolts 34 pass through the slots 33 and the sides of the section 23 and are provided with nuts 35 or other suitable means for clamping the sections in adjusted position. By loosening the nuts 35 the section 27 may be swung downwardly from the position shown in Fig. 9 to angular relation with regard to section 23, as shown, for example, in Fig. 1. As the section 27 swings upon the pivot-shaft 25 the idler-sprockets 31, carried by the arms 29, move therewith and serve to maintain the proper tension on the chains and prevent such tension from being varied and to hold the return or idle portion thereof close to the trough, so that it will not strike or interfere with other objects, as when the conveyer is feeding into a crib, bin, or other structure. In order to prevent the existence of a gap between the adjacent ends of the bottom of the hinged sections when the latter are angularly disposed, which gap would permit the grain to fall between the sections and spill to the ground, there is secured to the bottom of the section 27 a plate 36, which is carried beyond the shaft 25 and extended partially around and concentrically with the said shaft, as shown in Fig. 12, to coöperate with the bottom of the section 23 or with a plate 37, secured thereto, the forward end of the plate 37 terminating in contact with the curved portion of the other plate 36. These coöperating parts bridge the space between the bottoms of the sections irrespective of the angularity of the sections.

Secured to the inner faces of the sides of the section 23 are guards 38, which may be of the outline shown and consist of sheet metal and overlap the sides of the section 27, so as to close the space between the adjacent edges of the sides and prevent grain spilling out at this point when the sections are angularly disposed. Each of these guards 38 is provided with an angular portion or flange 39, as shown in Figs. 9 and 10, which overhangs the upper edges of the sides, so as to prevent grain from spilling into and lodging between the sides when the sections are disposed at an angle.

Located at the discharging end of the conveyer-trough is a deflector 40, designed to prevent the grain from dropping down between the flights 20 as the latter leave the bottom of the trough and also to prevent the grain from being whipped back as the flights are deflected from their straight-line course to return under the conveyer-trough. In the construction illustrated the deflector 40 is slidingly seated in a recess 41 in the upper face of the bottom of the trough and under the sheathing 12, as shown in Fig. 13, and its outer end is bent around or downwardly beyond the shaft 14, concentrically therewith. As will be apparent from Fig. 13, the conveyer-flights travel in contact with the deflector, and the latter closes the space between the adjacent end of the bottom 11 and the shaft 14, extending along the line taken by the flights in turning around the shaft, and as the flights pass over and in contact with this deflector the grain is projected forwardly by centrifugal action and is prevented by the curved depending portion of the deflector from being whipped back by the flights. The curved portion of the deflector is cut back at the edges to accommodate the sprockets on the shaft 14, the body portion thereof being the width of the bottom 11. As the shaft 14 is designed to be adjusted, the deflector 40 is so mounted as to be adjusted with the said shaft, so as to maintain its position relatively to the flights 20, and to this end it is provided with a sleeve 42, fixed thereto within its concentric portion and through the aperture of which the shaft 14 loosely passes, and the sleeve is centrally disposed with regard to the side edges of the deflecting-plate, as shown in dotted lines in Fig. 8. By this arrangement when the shaft 14 is moved longitudinally of the conveyer the deflecting-plate will be moved in a corresponding manner, sliding in the recess 41, although by reason of its loose connection with the said shaft the movement of the deflector will be in a straight line and not affected by any irregularity in the adjustment of the ends of the shaft 14, thereby preventing the side edges of the deflector from binding against the side walls of the conveyer-trough. Guides 43, one of which is secured to each side of the trough adjacent to the discharge end of the conveyer, serve to support the chains as they leave the sprockets on the shaft 14.

As the conditions under which conveyers of this character are used vary, long conveyers being required in some instances, while shorter ones are required in other instances, it has been the practice to manufacture the conveyers to order to suit the varying requirements. To avoid this, we have devised a system of units, so that a conveyer of any desired length may be built from units kept in stock. To this end, as shown in Figs. 1 to 6, inclusive, a series of units is provided, each of which is adapted to be connected with any other unit of the series. The units are suitably connected—as, for example, by the strips 44, extending from one end of one of an associated pair of units and adapted to receive and retain the other unit of such pair, as shown, for example, in Fig. 1. In any conveyer a boot or receiving end unit 45 and a discharge-end unit 46 (and when the conveyer consists of hinged sections a hinged unit 47) are employed, and each section of the conveyer may be made of varying lengths by means of intermediate units 48 and 49, which obviously may be of different lengths.

Having described our invention, what we claim is—

1. In a device of the class described, the combination with hinged sections and an endless conveyer therefor, of means carried by one section for maintaining the tension of the conveyer when and as the angularity of the sections is varied, and means for securing the sections together in their adjusted position.

2. In a device of the class described, the combination with the trough-sections, of a hinge connection between such sections to permit of angular movement between the same, an endless conveyer mounted on the sections and adapted to travel along the troughs, idlers on the hinge-axis over which the upper stretch of the conveyer passes, and movable idlers over which the understretch of the conveyer passes and adapted to take up the slack of the conveyer when and as the angularity of the sections is varied.

3. In a device of the class described, the combination with the hinged sections, an endless conveyer supported at the remote ends of the sections, arms carried by one of the sections at its hinged end, idlers carried by the arms and over which the return stretch of the conveyer travels, a wing rigid with one of the sections, and means for securing the wing to the other section to hold the sections in adjusted position.

4. In a device of the class described, the combination with trough-sections, a shaft mounted on one of the sections and on which the other section is pivoted, an endless conveyer supported at the remote ends of the sections, arms carried by one section at its pivoted end and provided with idlers over which the return stretch of the conveyer travels, and means at the adjacent ends of the sections for securing the pivoted section against movement on the pivot-shaft.

5. In a device of the class described, the combination with the trough-sections, a shaft mounted on the end of one section and on which the other section is pivoted, an endless conveyer supported at the remote ends of the sections and consisting of chains provided with flights adapted to travel along the bottom of the trough, idlers on the shaft over which the upper stretches of the chains pass, depending arms fixed to the pivoted section and provided with a shaft having idlers over which the return stretches of the chains travel, wings rigid with the arms and overlapping the sides of the adjacent end of the other section and having slots concentric with the pivot-shaft, and bolts passing through the slots to secure the sections in position.

6. In a device of the class described, the combination with hinged sections adapted to be adjusted in different angular relations, and a conveyer therefor, of a pair of coöperating plates on the sections bridging the gap between the same, and means for securing the sections in adjusted position.

7. In a device of the class described, the combination with the hinged trough-sections and an endless conveyer therefor, of a pair of coöperating plates one of which is mounted on the bottom of one of the sections and is provided with an extension concentric with the hinge, the other plate extending from the bottom of the other section and terminating in contact with the said concentric extension, and means for securing the sections in adjusted positions.

8. In a device of the class described, the combination with the adjustable hinged sections providing a continuous conveyer-trough, and a conveyer therefor, of a guard secured to each side wall of one of the sections and overlapping the adjacent side wall of the other section.

9. In a device of the class described the combination with the hinged trough-sections and an endless conveyer therefor, of a guard secured to each side wall of one of the sections and freely overlapping the adjacent side wall of the other section and having a flange overhanging the upper edges of such walls.

10. In a device of the class described, the combination with the hinged trough-sections and an endless conveyer therefor, of a pair of coöperating plates at the hinged ends of the sections bridging and closing the gap between the bottoms of the trough-sections, and a guard secured to each side wall of one of the sections and freely overlapping the adjacent side edge of the other section.

11. In a device of the class described, the combination with a conveyer, an adjustable shaft provided with a wheel over which the conveyer travels, and a deflector connected to the shaft.

12. In a device of the class described, the combination with a conveyer, adjustable carrying-wheels for the conveyer, and a deflector over which the conveyer travels and which is adjusted by adjustment of the carrying-wheels.

13. In a device of the class described, the combination with a frame and a conveyer carried thereby, of an adjustable deflector located at the discharge end of the frame and over which the conveyer travels.

14. In a device of the class described, the combination with a conveyer-trough, a conveyer carried thereby and provided with flights traveling over the bottom of the trough, of a deflector slidably mounted on the trough-bottom and having a downwardly-curved portion extending beyond the delivering end of the said bottom.

15. In a device of the class described, the combination with a conveyer-trough, of a shaft journaled on the sides of the trough and provided with wheels, a conveyer carried by the trough and running over the said wheels, and a deflector slidably mounted on and projecting from the bottom and having a curved portion supported by and extending around the shaft.

16. In a device of the class described, the combination with a conveyer-trough, an adjustable shaft journaled on the sides of the trough and provided with sprocket-wheels, a conveyer carried by the trough and consisting of sprocket-chains located at the opposite sides of the trough and meshing with the sprocket-wheels, flights connected to the chains at opposite points, of a deflector extending the width of and slidable on the bottom of the trough and extending from the delivery end of the latter and having a curved portion disposed concentrically with and supported by the shaft.

17. In a device of the class described, the combination with a conveyer-trough, a shaft adjustably mounted on the sides thereof and provided with sprocket-wheels, a conveyer carried by the trough and consisting of a pair of endless chains meshing with the sprocket-wheels and provided with flights traveling over and in contact with the bottom of the trough, a deflector slidably mounted on the bottom of the trough and having a curved portion extending around in advance of and concentrically with the shaft and a centrally-located sleeve having an aperture through which the shaft loosely passes.

18. In a device of the class described, the combination with a trough having a transverse shaft at each end, sprockets fixed to each shaft adjacent to each side of the trough, sprocket-chains at opposite sides of the trough and meshing with the sprocket-wheels, flights adapted to travel along and in contact with the bottom of the trough and consisting of slats attached to the chains between the longitudinal edges of the slats, and supports on the bottom of the trough at the sides thereof on which the upper stretches of the chains travel and by which such chains are supported, the said supports being provided on their inner adjacent edges with pockets opening into the trough.

19. A conveyer body or frame consisting of a series of units each of which is provided with strips at the sides extending beyond one end of such unit for attachment to the abutting end of another unit.

20. A conveyer body or frame consisting of a boot-end unit, a discharging-end unit, and intermediate units, each of such units except one of the end units being provided with strips secured to the sides thereof and extending beyond one end of such unit for attachment to the sides of the abutting end of one of the other units.

21. A conveyer body or frame consisting of a boot-end unit, a jointed unit, a discharging-end unit, and intermediate units, each of such units except one of the end units being provided with strips secured to the sides thereof and extending beyond one end of such unit for attachment to the sides of the abutting end of one of the other units.

22. In a device of the class described, the combination with a trough having longitudinal strips at the sides provided with pockets opening into the trough, of a conveyer having chains adapted to travel on said strips.

In testimony whereof we affix our signatures in presence of two witnesses.

JOHN Q. ADAMS.
ALONZO T. ADAMS.

Witnesses:
CHARLES H. ADAMS,
W. V. ADAMS.